United States Patent [19]
Kuwabara

[11] Patent Number: 6,150,924
[45] Date of Patent: Nov. 21, 2000

[54] SURFACE-MOUNTED ELECTROMAGNETIC SOUND GENERATING BODY

[75] Inventor: Atsushi Kuwabara, Fujiyoshida, Japan

[73] Assignee: Citizen Electronics Co., Ltd., Yamanashi-ken, Japan

[21] Appl. No.: 09/258,389

[22] Filed: Feb. 26, 1999

[30] Foreign Application Priority Data

Mar. 2, 1998 [JP] Japan .................................. 10-049193

[51] Int. Cl.⁷ ..................................................... H04B 3/36
[52] U.S. Cl. ........................ 340/407.1; 381/386; 379/433
[58] Field of Search ........................ 340/407.1; 381/386, 381/392, 393; 379/428, 429, 433

[56] References Cited

U.S. PATENT DOCUMENTS

5,461,672  10/1995  Enokido et al. ........................ 379/433
6,061,459   5/2000  Kobayashi et al. ..................... 381/386

*Primary Examiner*—Edward Lefkowitz
*Attorney, Agent, or Firm*—Browdy and Neimark

[57] ABSTRACT

A surface-mounted electromagnetic sound generating body comprises: a casing of an almost rectangular parallelepiped incorporating a sound generating unit; a sound release hole formed in a vertical wall of the casing; and a sound leakage prevention member attached to the vertical wall formed with the sound release hole; wherein the sound leakage prevention member is almost equal in shape to the surface of the vertical wall formed with the sound release hole and has an opening coaxial with the sound release hole. As a result, the sound leakage prevention member and the casing are combined together as one compact piece, contributing to a reduced size and an improved effect of the sound leakage prevention.

8 Claims, 9 Drawing Sheets

SURFACE-MOUNTED ELECTROMAGNETIC SOUND GENERATING BODY

BACKGROUND OF THE INVENTION

1. Field of the Invention

The present invention relates to a surface-mounted electromagnetic sound generating body incorporated in mobile communications devices, such as cellular phones and pagers, that generates an incoming call indicator tone when the device receives an incoming call, and more particularly to a thin surface-mounted electromagnetic sound generating body mounted on the surface of a printed circuit board or the like in a mobile communications device.

2. Description of the Prior Art

Figure 1:
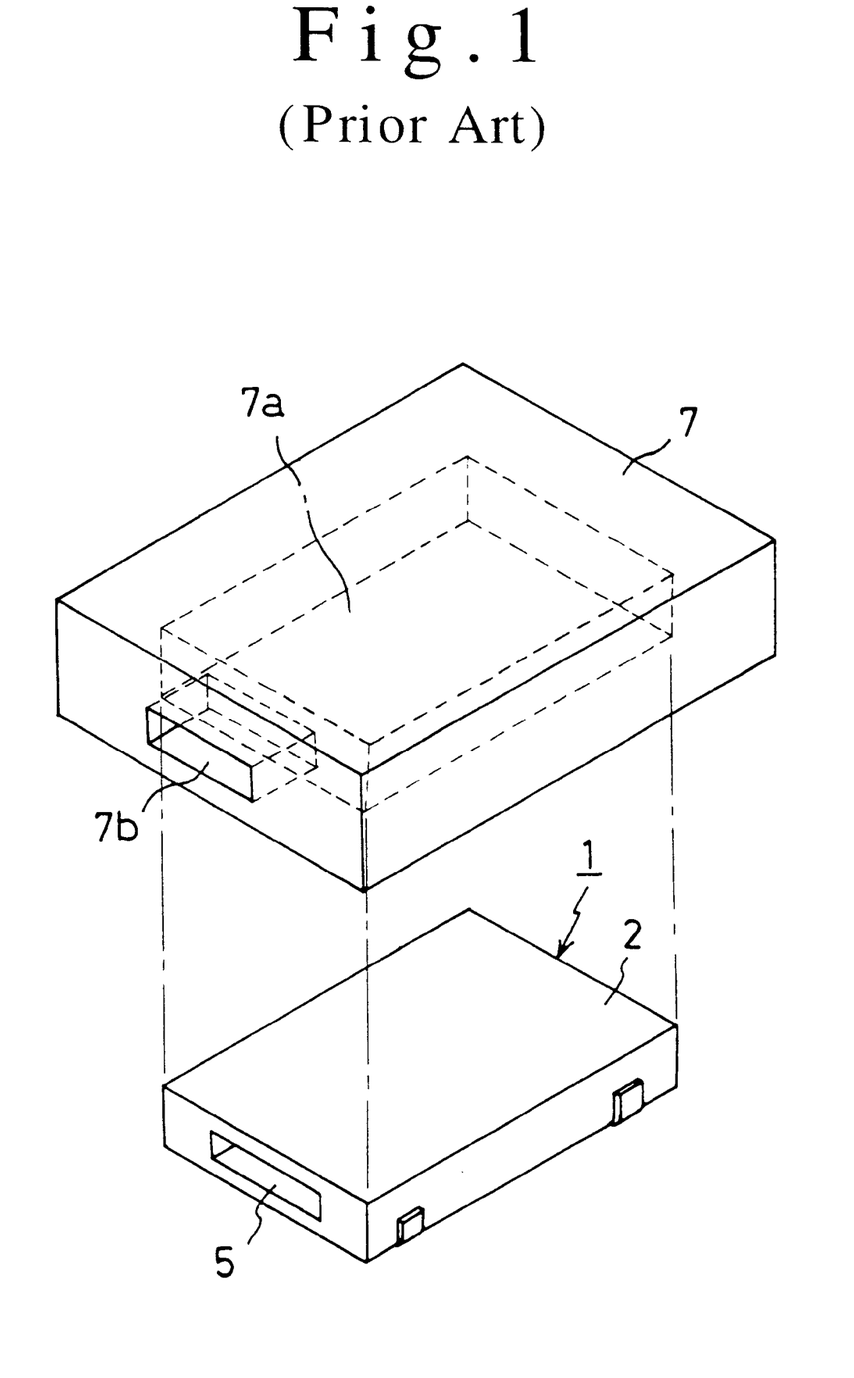
FIG. 1 is a perspective view showing an example of a packing fitted over the surface of a conventional surface-mounted electromagnetic sound generating body.

A known example of the surface-mounted electromagnetic sound generating body 1 of this kind includes a thin type which incorporates a vibrating sound generating unit (not shown) in a rectangular parallelepiped resin casing 2, as shown in FIG. 1.

Figure 2:
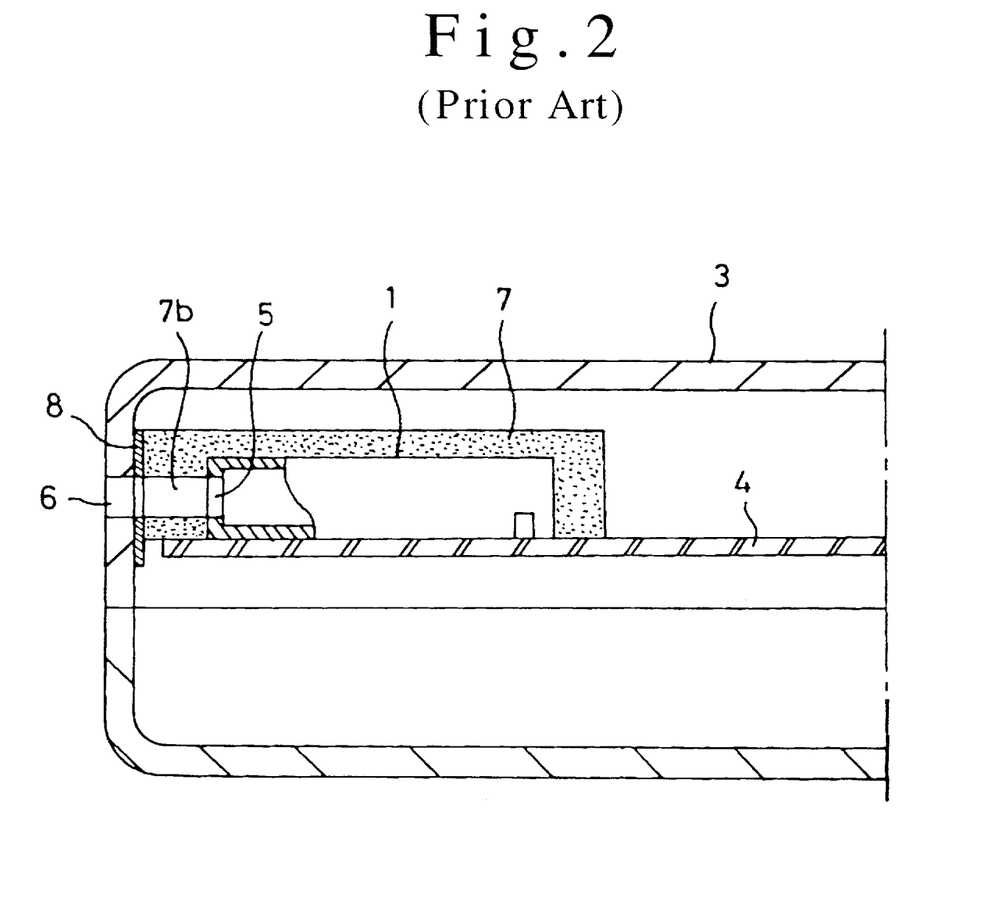

The surface-mounted electromagnetic sound generating body 1, as shown in FIG. 2, is incorporated in a body case 3 of a mobile phone, for example, and mounted on a printed circuit board 4. The casing 2 has a sound release hole 5 formed on a front side. The sound generating body 1 is surface-mounted on the printed circuit board 4 so that the sound release hole 5 faces an opening 6 formed in one part of the body case 3. A sound leakage prevention packing 7 is installed in a gap between the sound release hole 5 of the surface-mounted electromagnetic sound generating body 1 and the opening 6 in the body case 3 to prevent an incoming call indicator tone released from the sound release hole 5 from being trapped in the body case 3. This packing 7 has a hollow portion 7a to accommodate the entire casing 2 of the surface-mounted electromagnetic sound generating body 1, and a through-hole 7b that communicates the sound release hole 5 with the opening 6. After the electromagnetic sound generating body 1 is mounted on the printed circuit board 4, the packing 7 is fitted over the casing 2 from above. The inner side of the body case 3 around the opening 6 is bonded with a dust prevention cloth 8 to prevent dust, foreign matters, water droplets and humid air from entering into the body case 3. The packing 7 is installed in the body case 3 with the front side of the packing pressed against the dust prevention cloth 8.

Figure 3:
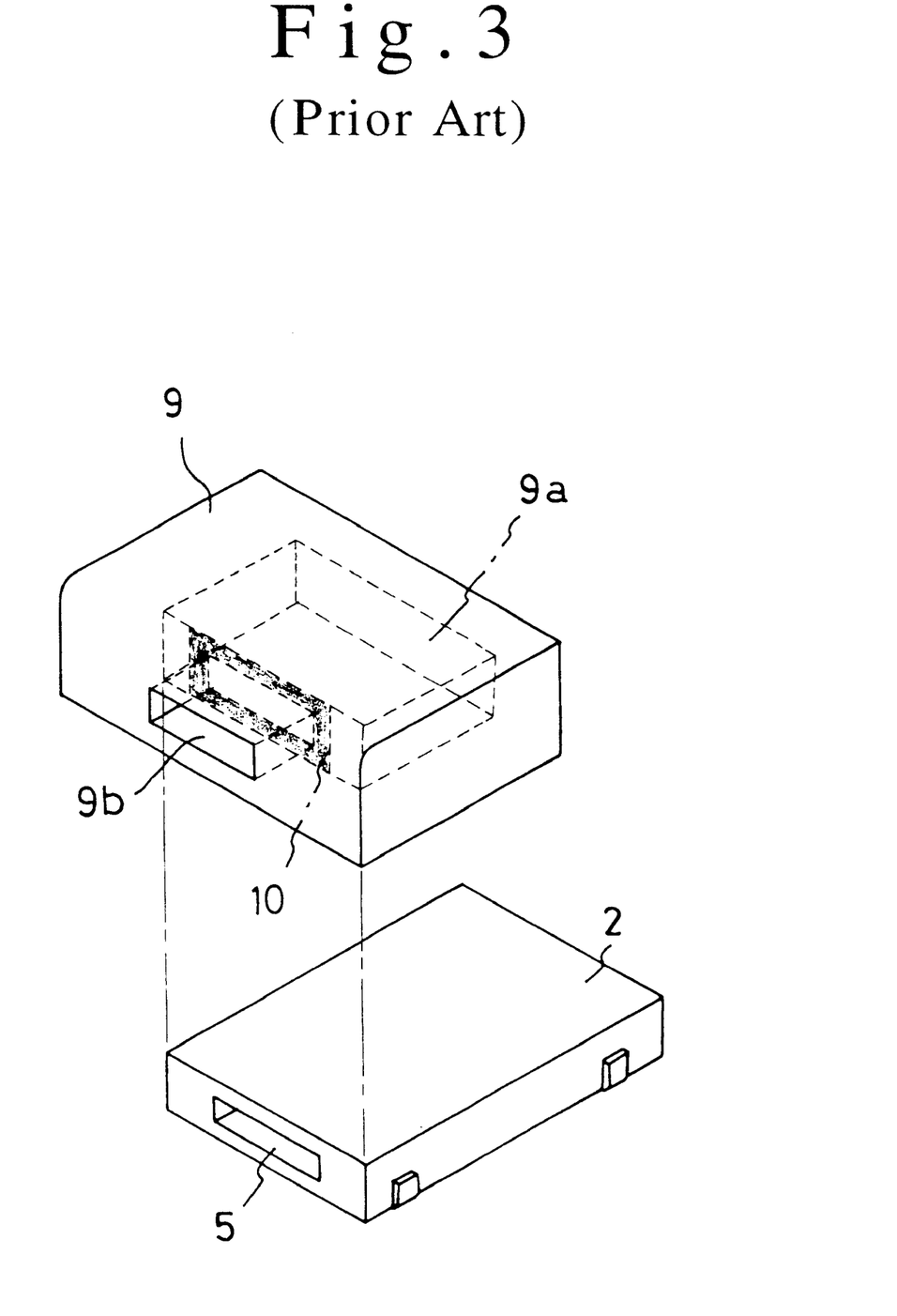
FIG. 3 is a perspective view showing another example of a packing fitted over the surface of a conventional surface-mounted electromagnetic sound generating body.
Figure 4:
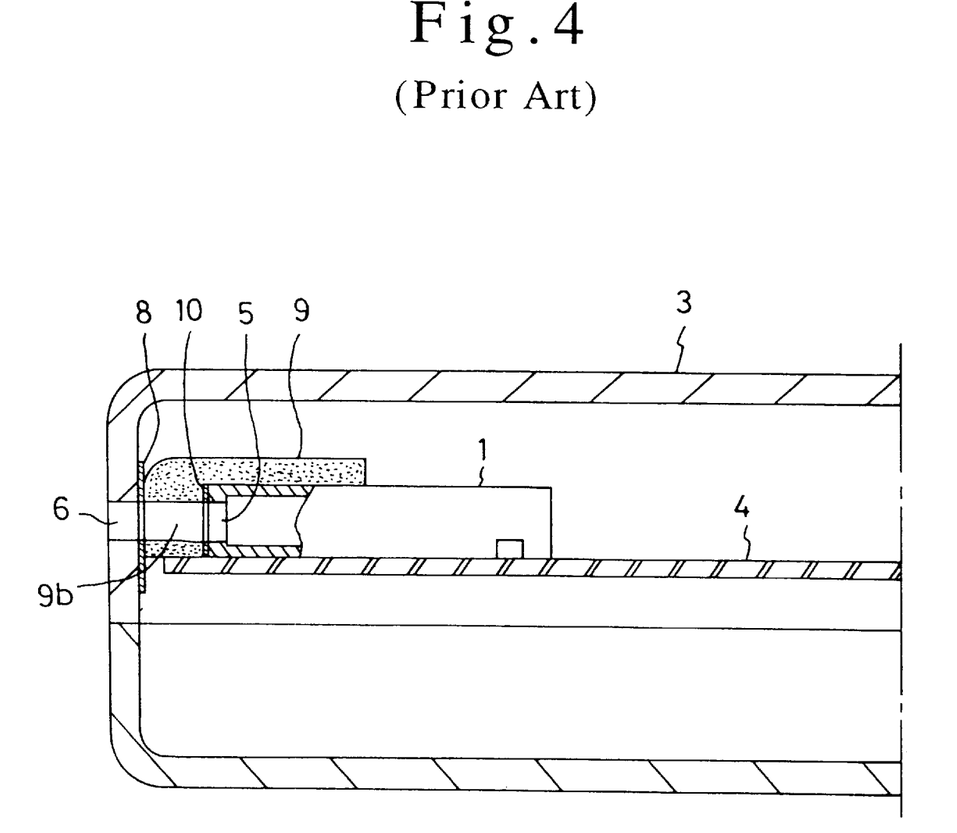

FIGS. 3 and 4 show another example of the conventional packing 9. The packing 9 has a hollow portion 9a covering the front half of the casing 2 and a through-hole 9b for communicating the sound release hole 5 to the opening 6. The packing 9 also has a double-sided adhesive tape 10 attached to the side of the hollow portion 9a around the through-hole 9b. When a mobile phone is assembled, a cover sheet is removed from the double-sided adhesive tape 10, which is then bonded to the periphery of the sound release hole 5 to fix the packing 9 to the casing 2.

With the conventional surface-mounted electromagnetic sound generating body 1 described above in the first and second examples, however, because the body 1 and the packing 7 or 9 are supplied separately to the mobile phone assembly line, the packing 7 or 9 must be attached, in a separate process, to the casing 2 of the body 1 surface-mounted on the printed circuit board 4.

Further, because the packing 7, 9 is formed as a cover that encloses the entire or front half of the casing 2, the volume occupied by the surface-mounted electromagnetic sound generating body 1 on the printed circuit board 4 increases, giving rise to a problem of greater limitations in mounting other parts.

SUMMARY OF THE INVENTION

A first object of the invention is to provide a surface-mounted electromagnetic sound generating body that can reduce the number of assembly processes in the manufacture of a mobile phone or other communications devices.

A second object of this invention is to minimize the volume occupied by the surface-mounted electromagnetic sound generating body on a printed circuit board during the manufacture of the mobile phone.

To achieve the above objectives, a surface-mounted electromagnetic sound generating body according to one aspect of this invention comprises: a thin casing of an almost rectangular parallelepiped incorporating a sound generating unit; a sound release hole formed in one of circumferential vertical walls of the thin casing; and a sound leakage prevention member attached to a front surface of the vertical wall formed with the sound release hole; wherein the sound leakage prevention member is almost equal in shape to the surface of the vertical wall formed with the sound release hole and has an opening coaxial with the sound release hole.

In a surface-mounted electromagnetic sound generating body according to another aspect of this invention, an opening formed in the sound leakage prevention member is equal in shape and size to the sound release hole.

In a surface-mounted electromagnetic sound generating body according to still another aspect of this invention, the thin casing comprises an upper case and a lower case, and the upper case and the lower case are secured together with a part of the sound leakage prevention member held between the upper and lower cases to package the casing and at the same time securely fix the sound leakage prevention member.

In a surface-mounted electromagnetic sound generating body according to a further aspect of this invention, the sound leakage prevention member has engagement portions secured to the thin casing at locations near the sound release hole of the thin casing, and the engagement portions are held between the upper and lower cases of the thin cases before the upper and lower cases are secured together.

In a surface-mounted electromagnetic sound generating body according to a further aspect of this invention, the engagement portions of the sound leakage prevention member are formed with engagement holes, at least one of the upper case and the lower case is formed with column portions near the sound release hole, and when the upper case and the lower case are secured together, the engagement holes are fitted over the column portions.

In a surface-mounted electromagnetic sound generating body according to a further aspect of this invention, the fixing of the upper case and the lower case of the casing is made by an ultrasonic welding.

In a surface-mounted electromagnetic sound generating body according to a further aspect of this invention, the sound leakage prevention member is formed of elastic silicone rubber or other heat resistant rubber or resin.

In a surface-mounted electromagnetic sound generating body according to a further aspect of this invention, a dust prevention cloth is bonded to a front surface of the sound leakage prevention member attached to the casing.

During the assembly of the surface-mounted electromagnetic sound generating body, this construction enables the sound leakage prevention member to be securely mounted to the casing by engaging the sound leakage prevention member around the sound release hole of the casing.

Because the sound leakage prevention member is attached beforehand to the casing around the sound release hole, the sound leakage prevention member attaching process, which has conventionally been carried out during the assembly of a cellular phone or the like, can be obviated, reducing the number of assembly processes to that extent.

Further, because the sound leakage prevention member is provided to the casing only around the sound release hole without covering the whole casing with a packing, this invention can reduce the volume occupied by the surface-mounted electromagnetic sound generating body on the printed circuit board, thus reducing limitations imposed on other components when mounting them on the printed circuit board.

Further, because the sound leakage prevention member is almost equal in shape to the vertical wall of the casing formed with the sound release hole and has an opening coaxial with the sound release hole, the stable mounting of the sound leakage prevention member to the casing is assured and they can be snugly combined as one piece, further enhancing the sound release effect.

With this invention, the sound leakage prevention member can be secured integrally to the casing by clamping a part of the sound leakage prevention member between the upper and lower cases of the casing and then securing the upper and lower cases together.

Further, the sound leakage prevention member is provided with engagement holes, which are then fitted over column portions provided to at least one of the upper and lower cases. This ensures that the sound leakage prevention member can reliably prevent sound leakage.

Further, because the sound leakage prevention member is formed of silicone rubber or other heat-resistant rubber or resin, it will not deteriorate even when it is passed through the reflow oven (a furnace into which hot air is supplied for drying) and subjected to elevated temperature. Hence, this member can maintain the sound leakage prevention effect for a long period of time.

Further, when a dust prevention cloth is bonded beforehand to the front surface of the sound leakage prevention member, it is possible during the assembly of the surface-mounted electromagnetic sound generating body to reduce the number of processes for bonding the dust prevention cloth to the inner surface of the body case of a cellular phone or the like.

These features and advantages of this invention will be described in more detail by referring to the accompanying drawings.

BRIEF DESCRIPTION OF THE DRAWINGS

FIG. 2 is a cross section showing the conventional surface-mounted electromagnetic sound generating body covered with the packing and installed in a mobile phone or the like;

FIG. 4 is a cross section showing the conventional surface-mounted electromagnetic sound generating body of FIG. 3 installed in a mobile phone or the like;

FIG. 10 is a cross-section showing the surface-mounted electromagnetic sound generating body of the first embodiment installed in a mobile phone or the like.

DESCRIPTION OF THE PREFERRED EMBODIMENTS

Figure 5:
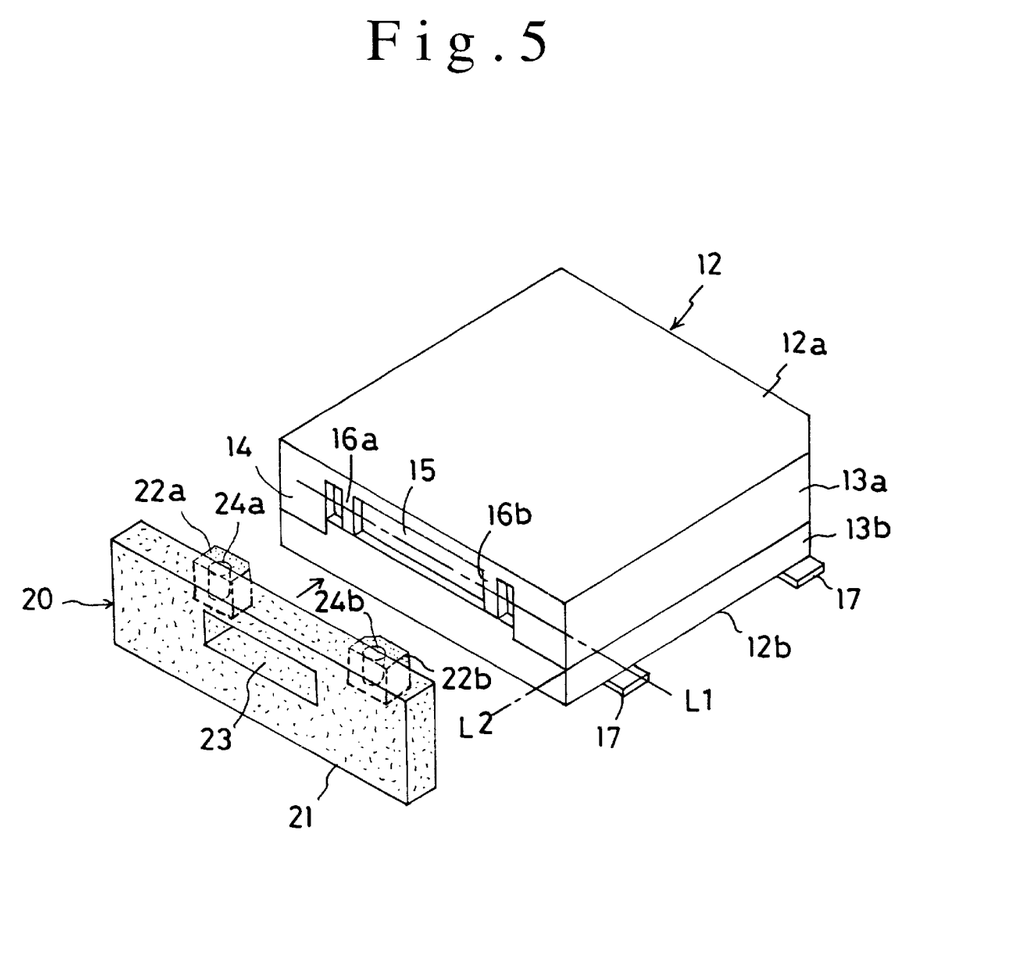
FIG. 5 is a perspective view showing one embodiment of a surface-mounted electromagnetic sound generating body according to this invention before being fitted with a packing.
Figure 6:
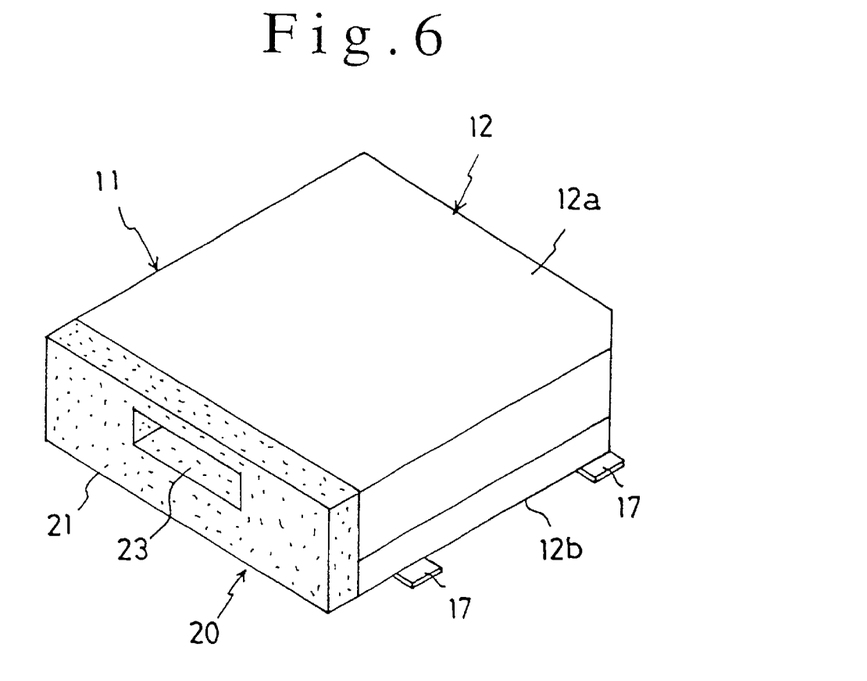
FIG. 6 is a perspective view showing the surface-mounted electromagnetic sound generating body of the first embodiment attached with the packing.
Figure 7:
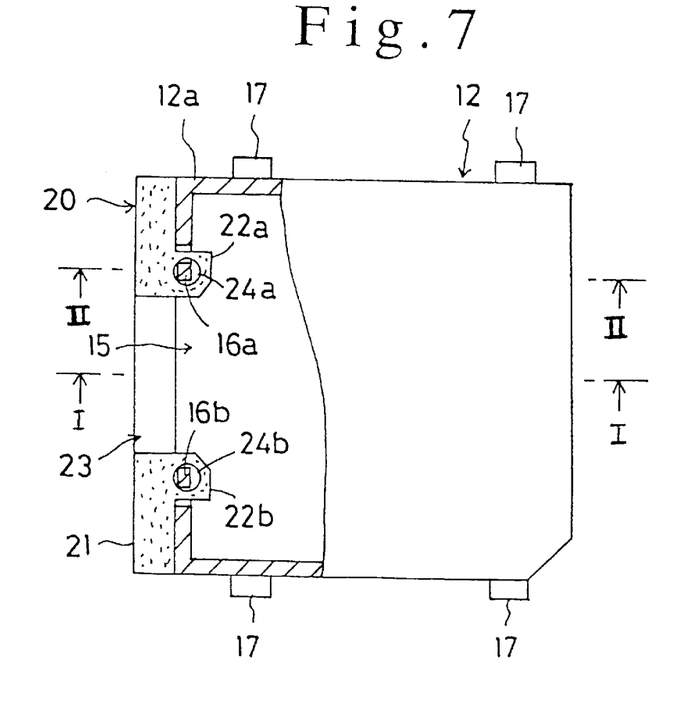
FIG. 7 is a partly cutaway plan view showing the surface-mounted electromagnetic sound generating body of the first embodiment with a casing of the surface-mounted electromagnetic sound generating body partly cut away to show a connecting structure of the casing and the packing.
Figure 8:
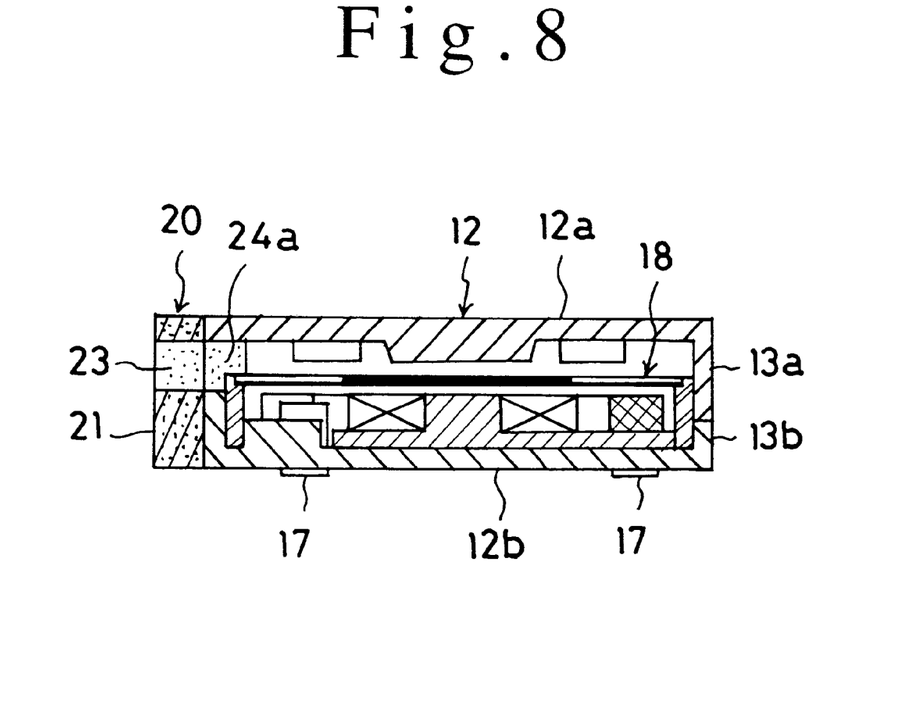
FIG. 8 is a cross section of the surface-mounted electromagnetic sound generating body of the first embodiment taken along the line A—A of FIG. 7, showing an inner structure of the sound generating body.
Figure 9:
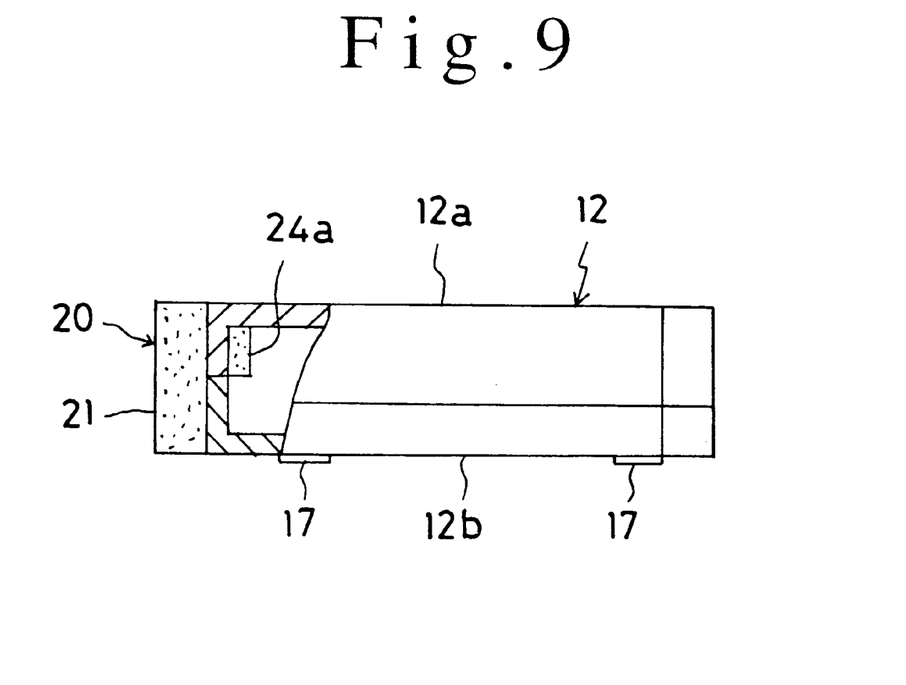
FIG. 9 is a partly cutaway plan view of the surface-mounted electromagnetic sound generating body of the first embodiment partly cut away along the line B—B of FIG. 7 to show a part of the inner structure of the sound generating body.
Figure 10:
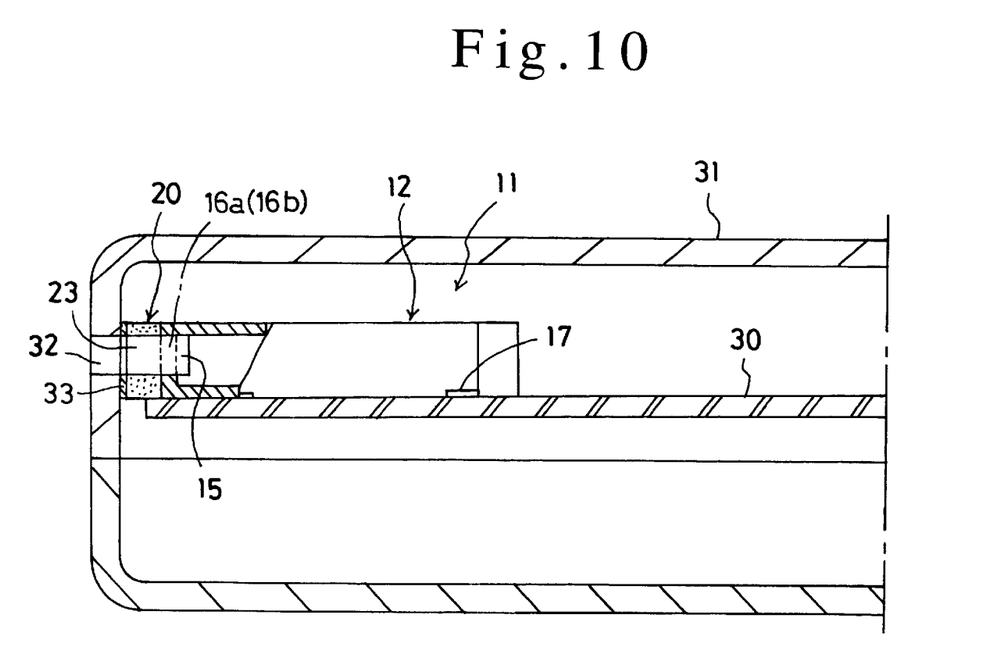

By referring to the accompanying drawings, embodiments of the surface-mounted electromagnetic sound generating body according to this invention will be described in detail. FIGS. 5 through 10 show a surface-mounted electromagnetic sound generating body 11 as a first embodiment of this invention. Of these, FIG. 5 is a perspective view of the first embodiment of the surface-mounted electromagnetic sound generating body according to this invention before being fitted with a packing. FIG. 6 is a perspective view of the surface-mounted electromagnetic sound generating body of the embodiment when fitted with the packing. FIG. 7 is a partly cutaway plan view of the surface-mounted electromagnetic sound generating body with a casing of the sound generating body partly cut away to show the connecting structure of the casing and the packing. FIG. 8 is a cross section of the surface-mounted electromagnetic sound generating body taken along the line A—A of FIG. 7, showing the inner structure of the sound generating body. FIG. 9 is a partly cutaway side view of the surface-mounted electromagnetic sound generating body partly cut away along the line B—B of FIG. 7 to show a part of another inner structure of the sound generating body. FIG. 10 is a cross section showing the surface-mounted electromagnetic sound generating body of the embodiment built into a mobile phone or the like.

In FIGS. 5 and 6, the surface-mounted electromagnetic sound generating body 11 has a vibrating sound generating member 18 (see FIG. 8) installed in a virtually rectangular parallelepiped-shaped thin casing 12. The casing 12 comprises an upper case 12a and a lower case 12b both made of resin, and the upper and lower cases 12a, 12b have vertical walls 13a, 13b along their circumference that secure the cases together by ultrasonic-welding. As shown in FIG. 5, the casing 12 has a horizontally elongate, rectangular sound release hole 15 formed in a front wall 14 through which an incoming call indicator tone generated by a vibrating sound generating unit 18 is released outside. A center line L1 of the sound release hole 15 is located higher than a weld line L2 between the upper case 12a and the lower case 12b. Further, column portions 16a, 16b formed of a part of the vertical wall 13a of the upper case 12a extend downward on both sides of and near the sound release hole 15. As shown in FIG. 7, electrode terminals 17 are provided at four corners of the lower case 12b.

The casing 12 of the above construction has a packing 20 as a sound leakage prevention member mounted to the front wall 14 thereof. The packing 20 is made of silicone rubber and, as shown in FIG. 5, comprises a blocklike body portion 21 of the same shape as the front wall 14 of the casing 12 and a pair of engagement pieces 22a, 22b as engagement portions projecting rearward of the body portion 21. The body portion 21 has an opening 23 having substantially the same shape and size as those of the sound release hole 15 and piercing therethrough in the front and rear direction. The engagement pieces 22a, 22b have engagement holes 24a, 24b extending vertically therethrough that fit over the column portions 16a, 16b of the upper case 12a.

Next, the procedure of assembling the casing 12 and the procedure of mounting the packing 20 will be described. First, in assembling the casing 12, the engagement holes 24a, 24b formed in the engagement pieces 22a, 22b of the packing 20 are fitted over the column portions 16a, 16b of the upper case 12a. In this state, the upper case 12a is aligned in position with the lower case 12b, which incorporates the vibrating sound generating unit 18, and the circumferential vertical walls 13a, 13b of the upper and lower cases 12a, 12b are brought into contact with each other. The packing 20 is then held between the upper case 12a and the lower case 12b. Next, the vertical walls 13a, 13b of the upper and lower cases 12a, 12b are ultrasonic-welded along the weld line L2 to rigidly fix them together, thereby securely mounting the packing 20 to the front wall 14 in which the sound release hole 15 is formed. At this time, the opening 23 of the packing 20 virtually overlaps the sound release hole 15 of the casing 12 on the same axis.

In this way, simply fitting into the engagement holes 24a, 24b the column portions 16a, 16b that were formed integral with the upper case 12a during the molding of the latter, the packing 20 can firmly be attached to the casing 12. Further, simply ultrasonic-welding the upper and the lower cases 12a, 12b together can also fix the packing 20 thus reliably preventing the packing 20 from coming off. Because the packing 20 is formed substantially equal in size and shape to the front wall 14 of the casing 12, it fits the casing 12 snugly. Although the packing 20 of this kind is difficult to handle as it is very small and flexible and has the opening 23 at the center, the handling of the packing 20 during the mounting is facilitated by forming it almost equal in shape to the front wall 14. This further enables the packing 20 to be mounted by an automatic assembly.

The surface-mounted electromagnetic sound generating body 11 made by assembling the casing 12 as described above is surface-mounted on a printed circuit board 30 and installed in a body case 31 of, for example, a cellular phone, as shown in FIG. 10. A dust prevention cloth 33 of the same shape as that of the packing 20 can be bonded beforehand to the front of the packing 20 to reduce the number of processes for bonding the dust prevention cloth 33 to the inner surface of the body case 31 during the assembly of the surface-mounted electromagnetic sound generating body 11. During mounting, the electrode terminals 17 are reflow-soldered to a patterned electrode (not shown) formed on the printed circuit board 30. At this time, the packing 20 also passes through the reflow oven but the silicon rubber is heat-resistant and does not deteriorate due to heat.

The sound release hole 15 of the casing 12 is opposed to an opening 32 in the body case 31 of the cellular phone and the dust prevention cloth 33 bonded to the front of the packing 20 is pressed against the inner side surface of the body case 31 around the opening 32, securely holding the surface-mounted electromagnetic sound generating body 11 to the body case 31.

In this embodiment, because the surface-mounted electromagnetic sound generating body 11 is supplied to the assembly line with the sound leakage prevention packing 20 attached beforehand to the casing 12, the sound generating body 11 attached wit the packing 20 can be surface-mounted simply by mounting the sound generating body 11 on the printed circuit board 30 and passing them through the reflow oven during the process of assembling the sound generating body 11 into a cellular phone. This eliminates the process of surface-mounting the sound generating body 11 and then attaching the packing 20, as is required by the conventional assembly process. Further, because the packing 20 does not cover the whole casing 12, the volume on the printed circuit board 30 occupied by the surface-mounted electromagnetic sound generating body 11 is kept small.

Figure 11:
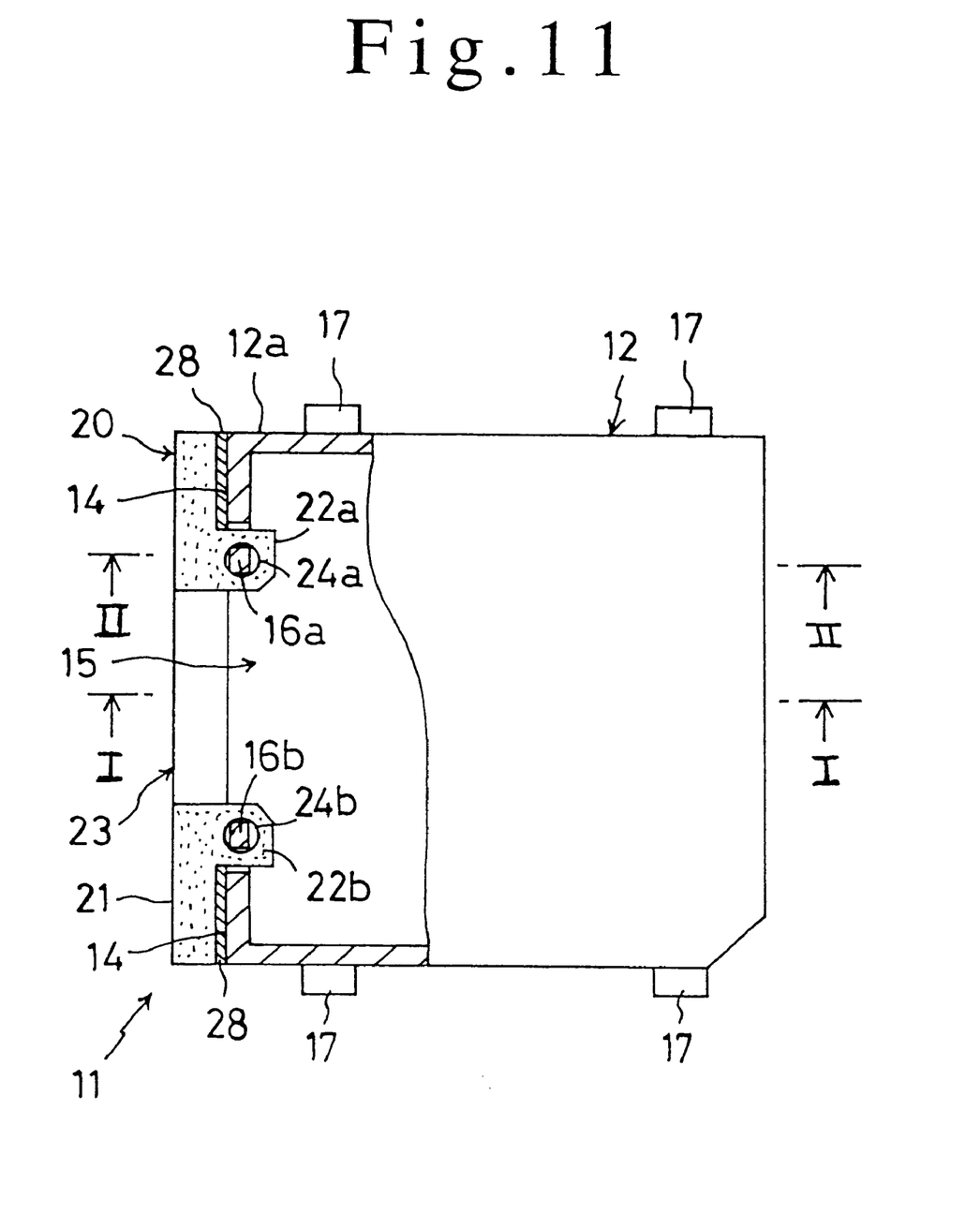
FIG. 11 is a plan view similar to FIG. 7 showing a second embodiment of the surface-mounted electromagnetic sound generating body according to this invention.

FIG. 11 shows a second embodiment of the surface-mounted electromagnetic sound generating body 11 according to this invention. This embodiment is almost similar to the first embodiment, except that a double-sided adhesive tape 28 is attached to a part or whole back surface of the body portion 21 of the packing 20 and is bonded to the front wall 14 of the casing 12. In this embodiment, parts identical with those of the first embodiment are assigned like reference numerals and detailed explanations are omitted. An entire or part of the back surface of the body portion 21 of the packing 20 may be applied with a bonding agent instead of the double-sided adhesive tape 28 and secured to the front wall 14 of the casing 12. The bonding of the whole back surface of the packing 20 to the entire front wall 14, combined with the engagement of the packing with the upper case 12a of the casing 12, assures a more secure fixing of the packing. In this embodiment, too, it is possible to attach the packing beforehand to the casing 12 prior to surface-mounting the sound generating body on the printed circuit board 30 and, in the mounted state, to pass them through the reflow oven. It is also possible to attach the dust prevention cloth 33 beforehand to the front of the packing 20.

While the above embodiments concern a case where the packing 20 is formed of silicone rubber, this invention can utilize rubber and resin materials with excellent heat resistance, such as fluororubber and acrylic elastomer, in addition to silicone rubber. Although in the above embodiments we have explained a case where the column portions 16a, 16b are provided to the upper case 12a of the casing 12, they may of course be provided to the lower side 12b or to both of the upper and lower cases 12a, 12b. Further, while the above embodiments have described a case where the electrode terminals 17 to be reflow-soldered to the printed circuit board 30 are provided to the four corners of the lower case 12b, they are not limited to these four locations and may be provided to at least two or more locations.

What is claimed is:

1. A surface-mounted electromagnetic sound generating body comprising:

a thin casing of an almost rectangular parallelepiped incorporating a sound generating unit;

a sound release hole formed in one of circumferential vertical walls of the thin casing; and a sound leakage prevention member attached to a front surface of the vertical wall formed with the sound release hole;

wherein the sound leakage prevention member is almost equal in shape to the surface of the vertical wall formed with the sound release hole and has an opening coaxial with the sound release hole.

2. A surface-mounted electromagnetic sound generating body according to claim 1, wherein the opening of the sound leakage prevention member is formed almost equal in shape and size to the sound release hole.

3. A surface-mounted electromagnetic sound generating body according to claim 1, wherein the thin casing comprises an upper case and a lower case, and the upper case and the lower case are secured together with a part of the sound leakage prevention member held between the upper and lower cases to package the casing and at the same time securely fix the sound leakage prevention member.

4. A surface-mounted electromagnetic sound generating body according to claim 3, wherein the sound leakage prevention member has engagement portions secured to the thin casing at locations near the sound release hole of the thin casing, and the engagement portions are held between the upper and lower cases of the thin casing before the upper and lower cases are secured together.

5. A surface-mounted electromagnetic sound generating body according to claim 3, wherein the engagement portions of the sound leakage prevention member are formed with engagement holes, at least one of the upper case and the lower case is formed with column portions near the sound release hole, and when the upper case and the lower case are secured together, the engagement holes are fitted over the column portions.

6. A surface-mounted electromagnetic sound generating body according to claim 3, wherein the fixing of the upper case and the lower case of the casing is made by an ultrasonic welding.

7. A surface-mounted electromagnetic sound generating body according to claim 1, wherein the sound leakage prevention member is formed of elastic silicone rubber or other heat resistant rubber or resin.

8. A surface-mounted electromagnetic sound generating body according to claim 1, wherein a dust prevention cloth is bonded to a front surface of the sound leakage prevention member attached to the casing.

\* \* \* \* \*